(12) United States Patent
Garnaud et al.

(10) Patent No.: US 7,188,008 B2
(45) Date of Patent: Mar. 6, 2007

(54) SYSTEM FOR CONTROLLING THE OPERATION OF AT LEAST ONE AIRCRAFT ENGINE

(75) Inventors: Christian Garnaud, Vineuil (FR); Brice Fernandez, Toulouse (FR)

(73) Assignee: Airbus France, Toulouse (FR)

( * ) Notice: Subject to any disclaimer, the term of this patent is extended or adjusted under 35 U.S.C. 154(b) by 188 days.

(21) Appl. No.: 10/516,539

(22) PCT Filed: Jan. 27, 2004

(86) PCT No.: PCT/FR2004/000176

§ 371 (c)(1),
(2), (4) Date: Dec. 2, 2004

(87) PCT Pub. No.: WO2004/078586

PCT Pub. Date: Sep. 16, 2004

(65) Prior Publication Data

US 2005/0174073 A1    Aug. 11, 2005

(30) Foreign Application Priority Data

Jan. 28, 2003    (FR) .................................. 03 00904

(51) Int. Cl.
*F04B 49/00* (2006.01)
*H02P 1/54* (2006.01)

(52) U.S. Cl. .................. 701/7; 701/3; 701/10; 318/42; 417/29

(58) Field of Classification Search .................. 318/42; 417/29; 701/3, 7, 10
See application file for complete search history.

(56) References Cited

U.S. PATENT DOCUMENTS

| | | | | |
|---|---|---|---|---|
| 4,208,591 A | * | 6/1980 | Yannone et al. | 290/40 R |
| 4,639,863 A | * | 1/1987 | Harrison et al. | 360/97.01 |
| 4,742,473 A | * | 5/1988 | Shugar et al. | 715/821 |
| 4,779,577 A | * | 10/1988 | Ritter et al. | 123/41.05 |
| 4,786,034 A | * | 11/1988 | Heess et al. | 267/64.15 |
| 4,928,638 A | * | 5/1990 | Overbeck | 123/184.56 |

(Continued)

FOREIGN PATENT DOCUMENTS

EP        0393730        10/1990

OTHER PUBLICATIONS

International Search Report dated Sep. 9, 2004.

(Continued)

*Primary Examiner*—Cuong Nguyen
(74) *Attorney, Agent, or Firm*—Stevens, Davis, Miller & Mosher, LLP (57) ABSTRACT

A system for supervising the speed of at least one engine of an aircraft includes three independent information sources determining first, second and third values for an aerodynamic parameter of the aircraft and precision information indicating the precision of these values. A control unit acts on the operation of the engine, and a sensor measures a fourth value for the parameter. An arithmetic unit selects a control value by using the first, second, third and fourth values of the aerodynamic parameter and the precision information and uses the control value to determine a control sequence for the control unit. An information transmission network, to which the three independent information sources and the arithmetic unit are connected, permits a transmission of information between the sources of information and the arithmetic unit.

11 Claims, 5 Drawing Sheets

U.S. PATENT DOCUMENTS

| | | | |
|---|---|---|---|
| 4,964,599 A * | 10/1990 | Farineau | 244/195 |
| 5,206,810 A | 4/1993 | Bools et al. | |
| 5,313,905 A * | 5/1994 | Calderon | 114/140 |
| 5,317,937 A * | 6/1994 | Yoshizawa et al. | 477/120 |
| 5,544,053 A * | 8/1996 | Nakashima | 701/57 |
| 5,592,195 A * | 1/1997 | Misono et al. | 715/860 |
| 6,137,187 A * | 10/2000 | Mikhail et al. | 290/44 |
| 6,206,299 B1 * | 3/2001 | Mann et al. | 239/69 |
| 6,208,497 B1 * | 3/2001 | Seale et al. | 361/160 |
| 6,231,011 B1 * | 5/2001 | Chu et al. | 244/165 |
| 6,253,144 B1 * | 6/2001 | Yamamura et al. | 701/96 |
| 6,411,944 B1 * | 6/2002 | Ulyanov | 706/13 |
| 6,590,633 B1 * | 7/2003 | Nishi et al. | 355/53 |
| 6,600,240 B2 * | 7/2003 | Mikhail et al. | 307/85 |
| 6,745,727 B1 * | 6/2004 | Kramer et al. | 123/41.11 |
| 6,792,758 B2 * | 9/2004 | Dowman | 607/772 |
| 6,847,128 B2 * | 1/2005 | Mikhail et al. | 290/44 |
| 6,856,039 B2 * | 2/2005 | Mikhail et al. | 290/44 |
| 6,952,060 B2 * | 10/2005 | Goldner et al. | 310/12 |
| 7,095,131 B2 * | 8/2006 | Mikhail et al. | 290/44 |

OTHER PUBLICATIONS

Y.C. Yeh, "Safety Critical Avionics for the 777 Primary Flight Controls System," 20th Digital Avionics Systems Conference (Cat. No. 01CH37219), Daytona Beach, FL, vol. 1, IEEE, XP002267095, ISBN 0-7803-7034-1, pp. 1.C.2-1-1.C.2-11, Oct. 14-18, 2001.

C. McClary et al., "Fault-Tolerant Air Data Inertial Reference System Development Results," IEEE XP002267096, ISBN 0-7803-1435-2, pp. 31-36, Apr. 11-15, 1994.

E. W. Dennis et al. "A Fault Tolerant Fly by Wire System for Maintenance Free Application," IEEE/AIAA/NASA 9th Digial Avionics Systems Conference (Cat. No. 90CH2929-8), Virginia Beach, VA, SP002267097, pp. 11-20, Oct. 15-18, 1990.

* cited by examiner

SYSTEM FOR CONTROLLING THE OPERATION OF AT LEAST ONE AIRCRAFT ENGINE

FIELD OF THE INVENTION

The present invention relates to a system for supervising the speed of at least one engine of an aircraft, in particular of a transport plane.

BACKGROUND OF THE RELATED ART

Generally, with each engine of a transport plane is associated a supervising unit which comprises in particular:
- a means of regulation for acting on the speed of the engine, as a function of control orders received. This means of regulation is able to adjust the flow rate of fuel intended to supply the engine; and
- a computation unit, for example an engine electronic regulator of the EEC ("Electronic Engine Control") type, which determines the control orders for said means of regulation.

This computation unit uses in particular information relating to the conditions under which the aircraft is maneuvering, that is to say information relating to aerodynamic parameters such as the static and total temperatures and/or the static and total pressures, to determine these control orders. For safety reasons, said computation unit uses several different sources to obtain this information, namely generally:
- an engine sensor, which is able to measure on the engine the value of the relevant aerodynamic parameter; and
- two airplane sources, for example of the ADIRU ("Air Data Inertial Reference Unit") type, which also have access to values of this aerodynamic parameter and which are connected individually by specific links, for example of ARINC 429 type, to said computation unit.

The computation unit must therefore select, from the various values of the aerodynamic parameter that it receives, that one which it will use for its computations.

In certain situations, a poor selection is possible, which may have very damaging effects. Specifically, an erroneous item of information which is not representative of the actual flight conditions of the aircraft brings about an erroneous computation of the engine speed so that the engine may then be led to operate in a mode inappropriate for said flight conditions. It may then even stop, for example when the speed demanded is too low for the conditions encountered.

SUMMARY OF THE INVENTION

An object of the present invention is to remedy these drawbacks. It relates to a particularly reliable and cheap system for supervising the speed of at least one engine of an aircraft, making it possible to avoid erroneous selection of the value of an aerodynamic parameter used.

For this purpose, according to the invention, said supervising system of the type comprising:
- a first and a second information source determining first and second values of at least one predetermined aerodynamic parameter of the aircraft; and
- at least one unit for supervising said engine, comprising:
  at least one means of regulation for acting on the speed of the engine as a function of control orders received;
  at least one sensor which is able to measure a fourth value of said aerodynamic parameter, on said engine; and
  a computation unit which is connected to said first and second information sources, to said means of regulation and to said sensor, which receives said first, second and fourth values of said aerodynamic parameter, which takes them into account so as to select a value of said aerodynamic parameter as control value, and which uses the control value thus selected at least to determine a control order which is transmitted to said means of regulation, is noteworthy in that
said system furthermore comprises:
- a third information source determining a third value of said predetermined parameter; and
- an information transmission network, to which are linked said first, second and third information sources and said computation unit allowing transmission of information between said information sources and said computation unit;

said first, second and third information sources are independent of one another;
said first, second and third information sources respectively determine first, second and third correctness information indicating the correctness respectively of said first, second and third values of said aerodynamic parameter; and
said computation unit selects said control value by using said first, second, third and fourth values of the aerodynamic parameter, as well as said first, second and third correctness information.

Thus, the computation unit avails itself not only of a large number of values (first to fourth values) for making the selection and choosing the most accurate and most appropriate value for the relevant aerodynamic parameter, but also of valuable aid afforded by said correctness information, which allows it to make the best possible value selection, and especially to avoid any poor selection (in contradistinction to the aforesaid known solution), as will be seen in greater detail hereinbelow. Moreover, as the various information sources are independent of one another, any error of one of said sources cannot affect the other sources.

Consequently, the supervising system in accordance with the invention is particularly reliable.

Furthermore, by virtue of said information transmission network, it is not necessary to connect the new elements (in particular said third information source) individually to the other elements, which would require numerous bulky and expensive specific links, so that the new elements can communicate with the others. It is in fact sufficient to link them, simply and directly, to said information transmission network.

Advantageously, to select the control value, the computation unit gives priority to the first, second, third values of said information sources with respect to said fourth value of the sensor, it chooses said fourth value only in case of lack of agreement between all the values, and it uses said correctness information at least to resolve any ambiguities.

In a preferred embodiment, said computation unit uses as control value:
1/ if said fourth value of the sensor is not valid:
   A/ if said first, second and third values of said first, second and third information sources are valid and are in agreement, said first value of said first information source;
   B/ otherwise:
      α) if two of said first, second and third values are valid and are in agreement and if the product of the two corresponding items of correctness information is equal to 1, a correctness item equaling 1 if the corresponding value is apparently correct and 0 otherwise, the lower value of said two values in agreement;

β) otherwise:

a) if one of said first, second and third values is valid and if the corresponding correctness item equals 1, this value which is valid;

b) otherwise, a predetermined value; and

2/ if said fourth value is valid:

A/ if one of said first, second and third values is valid and is in agreement with one other of them, as well as with said fourth value, this value in agreement;

B/ otherwise:

α) if two of said first, second and third values are valid and are in agreement and if the product of the two corresponding items of correctness information is equal to 1, the lower value of said two values in agreement;

β) otherwise:

a) if one of said first, second and third values is valid, if it is in agreement with said fourth value and if its correctness item equals 1, this value which is valid;

b) otherwise, said fourth value of the sensor.

According to the invention:

two values are in agreement when their difference is less than a predetermined threshold value; and a value is valid when it lies between two predetermined limit values.

Furthermore, advantageously, said computation unit carries out a weighting upon a change of selection of value for the control value (for example when it uses as control value firstly said third value of the third information source, then said first value of the first information source) so as to avoid abrupt jumps of the control value selected and used in the subsequent processing.

Additionally, advantageously:

said computation unit is disconnectable as regards the selection of the control value; and/or said computation unit receives said fourth value on two different channels, and uses the two values thus received.

According to the invention, for supervising the speeds of the engines of an aircraft fitted with a plurality of engines, for example four engines, the supervising system in accordance with the invention comprises, for each engine whose speed it supervises, a specific supervising unit (such as aforesaid) comprising a means of regulation, a sensor and a computation unit.

Advantageously, each of said information sources receives from all the supervising units the fourth values measured by the sensor of each of said supervising units and determines its correctness item from these fourth values.

Consequently, in the case of an aircraft with n engines, each computation unit uses directly or indirectly n+3 values of the relevant aerodynamic parameter (namely said first, second and third values of said information sources, which are taken into account directly (as well as its fourth value), and the n fourth values of said n sensors, which are taken into account indirectly in the computation of the correctness information), this making it possible to raise the accuracy of selection and to increase safety.

In a preferred embodiment, to determine its correctness item, each information source:

computes all the differences between, on the one hand, said fourth values and, on the other hand, its own value of said aerodynamic parameter;

compares the differences with a predetermined threshold value; and deduces therefrom:

if at least half of said differences are below said threshold value, that said correctness item equals 1; otherwise, that it equals 0.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
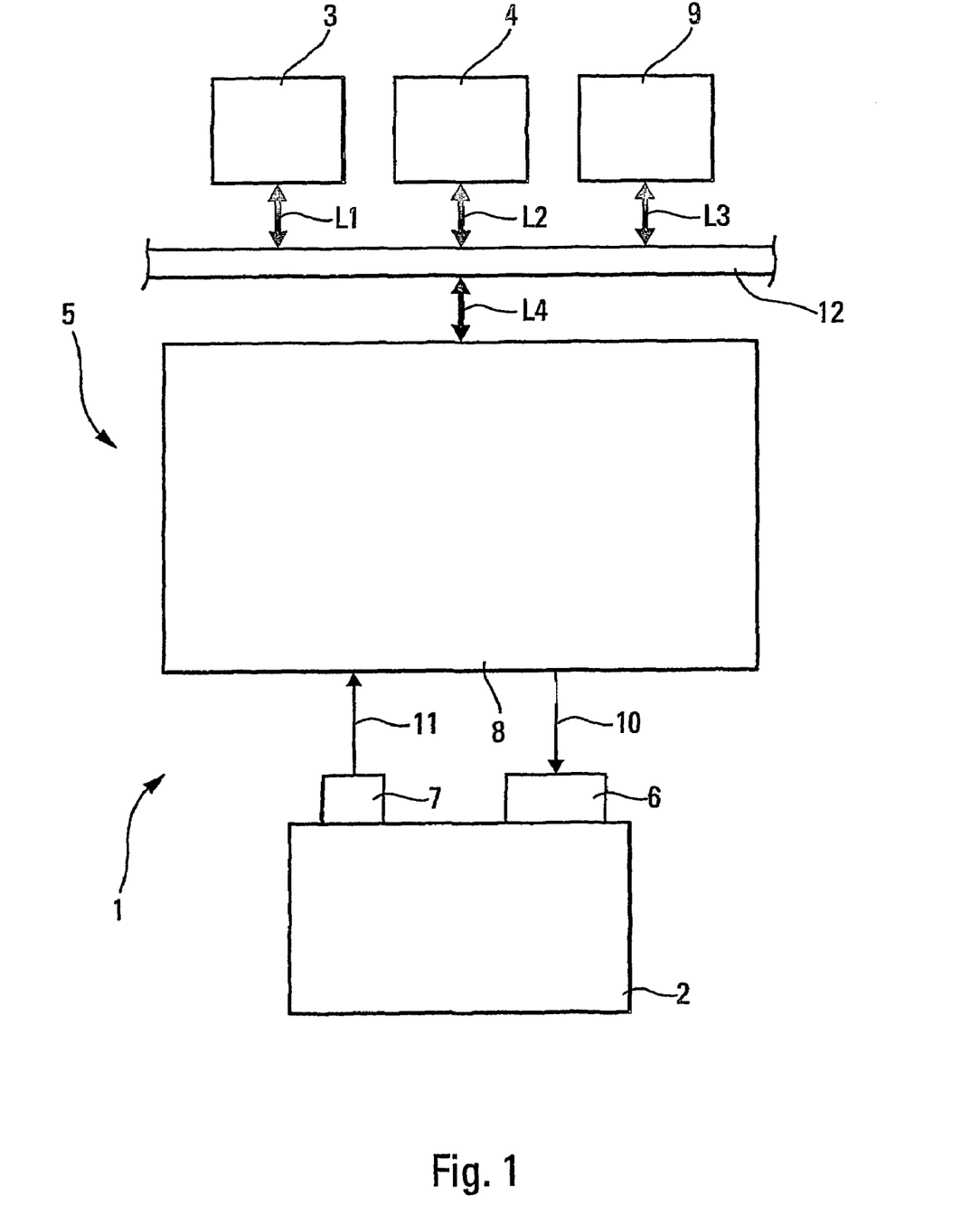
FIG. 1 is the schematic diagram of a system in accordance with the invention.

The system 1 in accordance with the invention and represented diagrammatically in FIG. 1 is intended to supervise the speed of at least one engine 2 of an aircraft, in particular of a transport plane.

Said system 1 is of the type comprising:

a first and a second standard information source 3 and 4 of the aircraft, for example of ADIRU ("Air Data Inertial Reference Unit") type, which are able to determine first and second values of at least one predetermined aerodynamic parameter of said aircraft, such as for example the static temperature, the total temperature, the static pressure or the total pressure; and at least one unit 5 for supervising said engine 2, comprising:

at least one standard means of regulation 6 for acting on the speed of the engine 2, as a function of control orders received. This means of regulation 6 is able to adjust the flow rate of fuel intended to supply the engine 2;

at least one sensor 7 which is able to measure a fourth value of said aerodynamic parameter, on said engine 2; and a computation unit 8, for example an engine electronic regulator of EEC ("Electronic Engine Control") type, which determines the control orders for said means of regulation 6 and which can form part of a full authority digital electronic regulating system of the engine of FADEC ("Full Authority Digital Engine Control") type. Said computation unit 8 is connected to said first and second information sources 3 and 4, as specified hereinbelow, as well as to said means of regulation 6 and to said sensor 7, respectively by way of links 10 and 11. The computation unit 8 receives said first, second and fourth values of said aerodynamic parameter, and takes them into account to select a value of said aerodynamic parameter as control value. It uses the control value thus selected at least to determine a control order which is transmitted to said means of regulation 6.

According to the invention, said supervising system 1 moreover comprises:
- a third information source 9 similar to said sources 3 and 4, which determines a third value of said predetermined aerodynamic parameter; and
- an information transmission network 12 to which are linked said information sources 3, 4, 9 and said computation unit 8, as represented in FIG. 1 in a general and diagrammatic manner by links L1, L2, L3 and L4. Said network 12 allows transmission of information between said information sources 3, 4, 9 and said computation unit 8.

Thus, these elements 3, 4, 8, 9 may communicate among themselves without it being necessary to connect them directly together by specific individual connections (of the ARINC 429 type for example), thereby making it possible to reduce the cost and the bulk of the system 1.

Moreover, according to the invention:
- said first, second and third information sources 3, 4, 9 are independent of one another;
- said first, second and third information sources 3, 4, 9 respectively determine first, second and third correctness information indicating the correctness respectively of said first, second and third values of said aerodynamic parameter, as specified hereinbelow; and
- the computation unit 8 selects said control value by using said first, second, third and fourth values of the aerodynamic parameter, as well as said first, second and third correctness information.

Accordingly, according to the invention, said computation unit 8 gives priority to the values of said information sources 3, 4, 9 with respect to said fourth value of the sensor 7. It chooses said fourth value only in case of lack of agreement between all the values received, and it uses said correctness information at least to resolve any ambiguities, as specified hereinbelow.

Thus, the computation unit 8 avails itself not only of a large number of values (first to fourth values) for making the selection and choosing the most accurate and most appropriate value for the relevant aerodynamic parameter, but also of valuable aid afforded by said correctness information, which allows it to make the best possible value selection, and especially to avoid any (poor) selection or an inappropriate value (caused for example by a malfunction of a sensor).

According to the invention, the computation unit 8 implements a particular mode (or law) of selection to select the control value on the basis of the various values received, mentioned previously.

Figure 2:
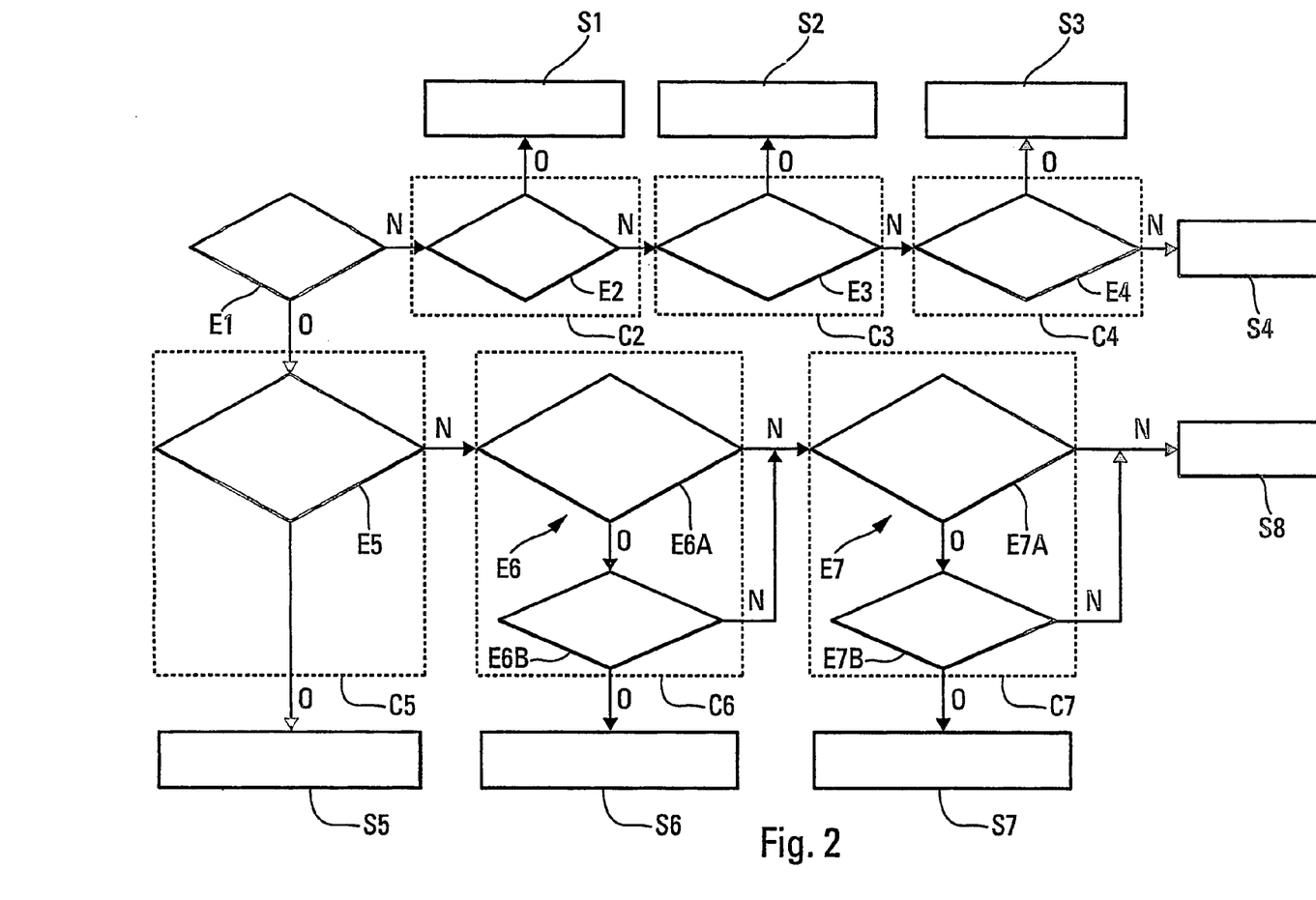
FIG. 2 diagrammatically illustrates the various steps of a mode of selection implemented by a computation unit of a system in accordance with the invention.

In a preferred embodiment, said computation unit 8 implements the selection law whose schematic comprising steps E1 to E7 has been represented in FIG. 2.

The computation unit 8 firstly verifies in step E1 whether the fourth value received from the sensor 7 is available and valid. If this is not the case (yes: O; no: N), it implements step E2, to verify whether said first, second and third values of said first, second and third information sources 3, 4 and 9 are valid and are in agreement. Within the context of the present invention:
- a value (or an information source from which it arises) is valid when this value lies between two predetermined limits. It is therefore invalid if it is outside said limits, and is so preferably for a predetermined duration, for example for five seconds; and
- two values are in agreement when their difference is less than a predetermined threshold value.

Figure 3:
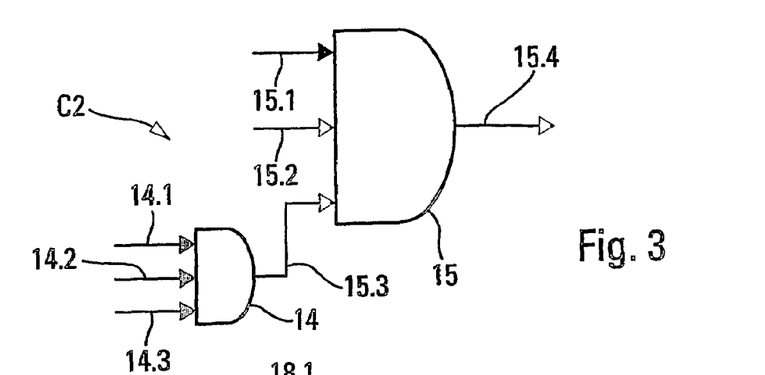
FIGS. 3 to 8 diagrammatically show various computation elements allowing the implementation of various steps of the mode of selection illustrated in FIG. 2.

This step E2 can be implemented with the aid of the computation element C2 represented diagrammatically in FIG. 3. This computation element C2 comprises:
- a first logic AND gate 14, whose inputs 14.1, 14.2 and 14.3 receive the information item regarding validity of said sources 3, 4 and 9; and
- a second logic AND gate 15, whose inputs 15.1, 15.2 and 15.3 respectively receive the information item regarding agreement between the sources 3 and 4, the item regarding agreement between the sources 3 and 9, and the result arising from the gate 14, and the result of which is available at the output 15.4.

If the result is positive (o), the solution S1 of the selection concerns the selection of said first value arising from the source 3 as control value.

On the other hand, if the result is negative (N), the computation unit 8 implements step E3 to verify whether two of said first, second and third values are valid and are in agreement and whether the product of the two corresponding items of correctness information is equal to 1, a correctness item equaling 1 if the corresponding value is apparently correct and 0 otherwise, as specified hereinbelow. This step E3 may be implemented with the aid of the computation element C3 represented in FIG. 4. This computation element C3 comprises:
- a first logic AND gate 16, whose inputs 16.1 and 16.2 receive the item regarding validity of two chosen sources. The computation element C3 is implemented for all the pairs of sources possible, comprising two of said three sources 3, 4 and 9;
- a second logic AND gate 17, whose inputs 17.1 and 17.2 are informed if the correctness information are at 1 or otherwise; and
- a third logic AND gate 18, whose inputs 18.1, 18.2 and 18.3 respectively receive the information item regarding the agreement of the two relevant sources and the results arising from said gates 17 and 16, and the result of which is available at the output 18.4.

Figure 4:
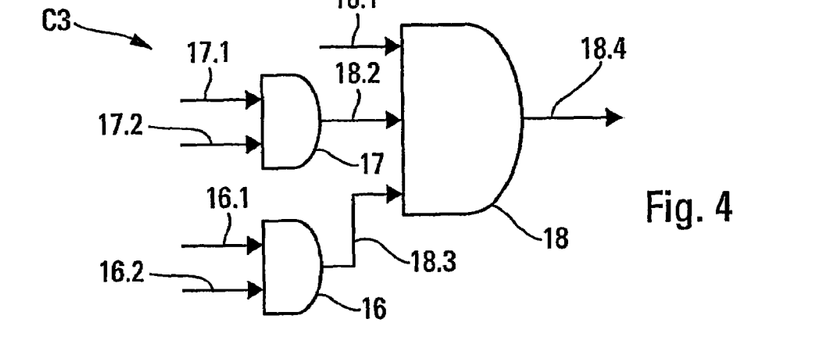

If the result at the output 18.4 is positive (o), the solution S2 of the selection concerns the selection of the lower value of the two sources in agreement, as control value.

Figure 5:
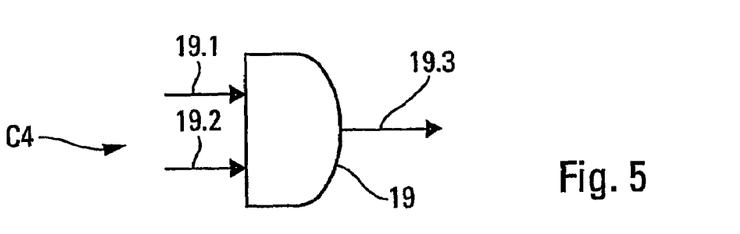

On the other hand, if the result is negative (N), the computation unit 8 implements step E4 to verify whether one of said first, second and third values is valid and whether the corresponding correctness item equals 1 or otherwise. This step E4 may be implemented with the aid of the computation element C4 represented in FIG. 5. This computation element C4 comprises a logic AND gate 19, whose inputs 19.1 and 19.2 are informed, in respect of the relevant source, respectively if the (first, second or third) corresponding value is valid and if its correctness item is at 1 or otherwise, and the result of which is available at the output 19.3. If the result at the output 19.3 is positive (o), the solution S3 of the selection concerns the selection of this value which is valid, as control value, and, if the result is negative (N), the solution S4 concerns the selection of a predetermined value (which is therefore selected by default).

Additionally, if the fourth value received from the sensor 7 is available and valid (step E1), the computation unit 8 implements step E5 to verify whether one of said first, second and third values of the sources 3, 4 and 9 is valid and is in agreement with one other of them, as well as with said fourth value. This step E5 can be implemented with the aid of the computation element C5 represented in FIG. 6. This computation element C5 comprises a logic AND gate 20 of output 20.3, and whose inputs 20.1 and 20.2 are connected respectively to logic OR gates 21 and 22. The logic OR gate 21 is connected to a computation unit 23 by its inputs 21.1 and 21.2.

Figure 6:
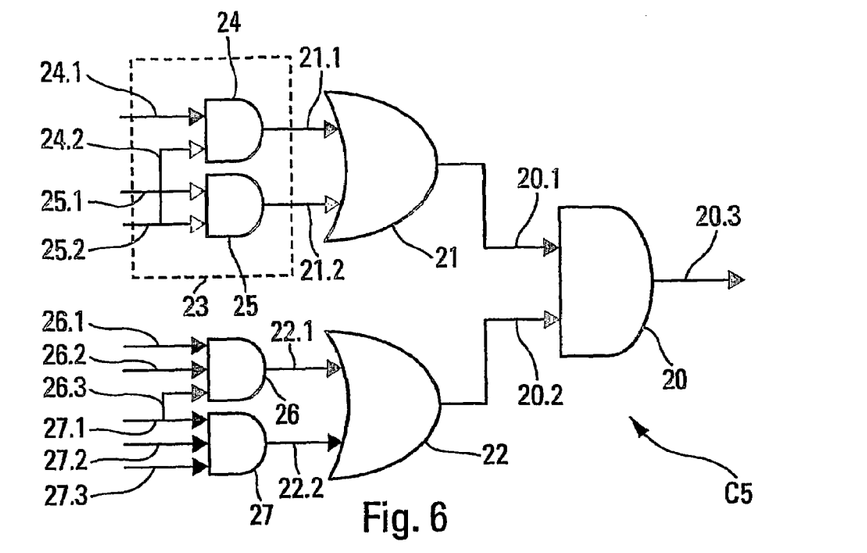

This computation unit 23 comprises:

a first logic AND gate 24, whose inputs 24.1 and 24.2 respectively receive the information item if the value of the source i (3, 4 and 9) considered is in agreement with a first indication or value VA of said fourth value from the sensor 7, and if this source i (3, 4 and 9) is valid. The fourth value measured by the sensor 7 is in fact sent on two different channels A and B according to two indications or values VA and VB; and a second logic AND gate 25, whose inputs 25.1 and 25.2 respectively receive the information item if the value of the source i (3, 4 and 9) considered is in agreement with the second indication or value VB of said fourth value (channel B), and if this source i (3, 4 and 9) is valid.

Furthermore, the logic OR gate 22 is connected by its inputs 22.1 and 22.2 respectively:

to a first logic AND gate 26, whose inputs 26.1, 26.2 and 26.3 respectively receive the information items if the source i and a source j (out of the sources 3, 4 and 9) are in agreement, if the source i is valid and if the source j is valid; and to a second logic AND gate 27, whose inputs 27.1, 27.2 and 27.3 respectively receive the information items if the source i is valid, if the third source k is valid and if said sources i and k are in agreement.

If the result of the processing implemented by the computation means C5 is positive (o), the solution S5 of the selection concerns the selection of the value (of said source i) which is in agreement, as control value.

Figure 7:
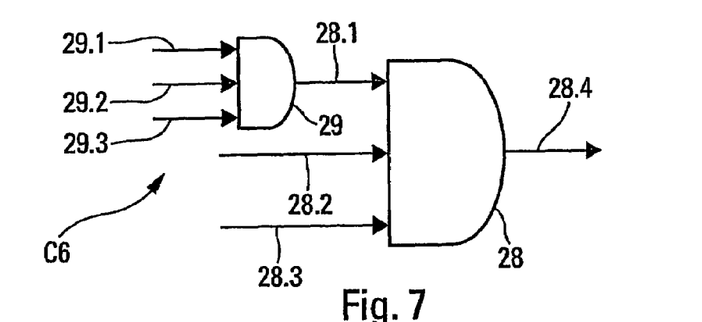

On the other hand, if the result is negative (N), the computation unit 8 implements step E6 to verify whether two of said first, second and third values are valid and in agreement (substep E6A) and if the product of the two corresponding items of correctness information is equal to 1 (substep E6B). This step E6 may be implemented with the aid of the computation element C6 represented in FIG. 7. This computation element C6 comprises:

a logic AND gate 28, whose inputs 28.2 and 28.3 are informed if the correctness information items respectively of two sources i and j (out of the sources 3, 4 and 9) are at 1 or otherwise, whose input 28.1 is connected to a logic AND gate 29, and whose output 28.4 provides the result; and said logic AND gate 29, whose input 29.1 is informed if the values of the sources i and j are in agreement, whose input 29.2 is informed if the source i is valid, and whose input 29.3 is informed if the source j is valid.

If the result of the processing implemented by the computation means C6 is positive (o), the solution S6 of the selection concerns the selection of the lower value of the two sources i and j in agreement, as control value.

On the other hand, if the result is negative (N) for substep E6A or for substep E6B, the computation unit 8 implements step E7, to verify whether one of said first, second and third values is valid and whether it is in agreement with said fourth value (substep E7A) and whether its correctness item equals 1 (substep E7B). This step E7 can be implemented with the aid of the computation element C7 represented in FIG. 8. This computation element C7 comprises a logic AND gate 30, of which an input 30.1 is connected to the computation unit 23 via the gate 21 (similar to that of FIG. 6), whose input 30.2 is informed if the correctness item of the relevant source does indeed equal 1 or otherwise, and whose result is available at the output 30.3.

Figure 8:
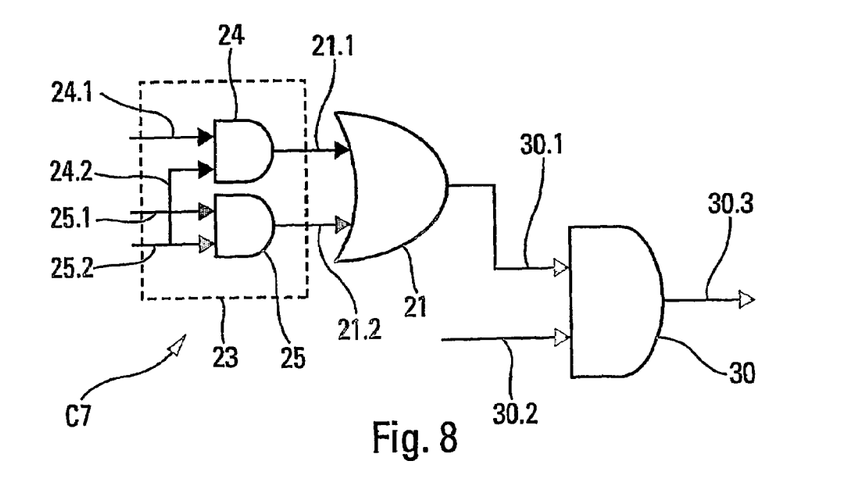

If the result at the output 30.3 is positive (o), the solution S7 of the selection concerns the selection of this value which is valid and in agreement with the fourth value, as control value and, if the result is negative (N), the solution S8 concerns the selection of said fourth value.

Said computation elements C2 to C7 are built into said computation unit 8.

Preferably, said computation unit 8 carries out a weighting upon a change of selection of value for the control value and, moreover, it is disconnectable as regards the selection of the control value. This is beneficial in particular on the ground for avoiding erroneous detections.

Figure 9:
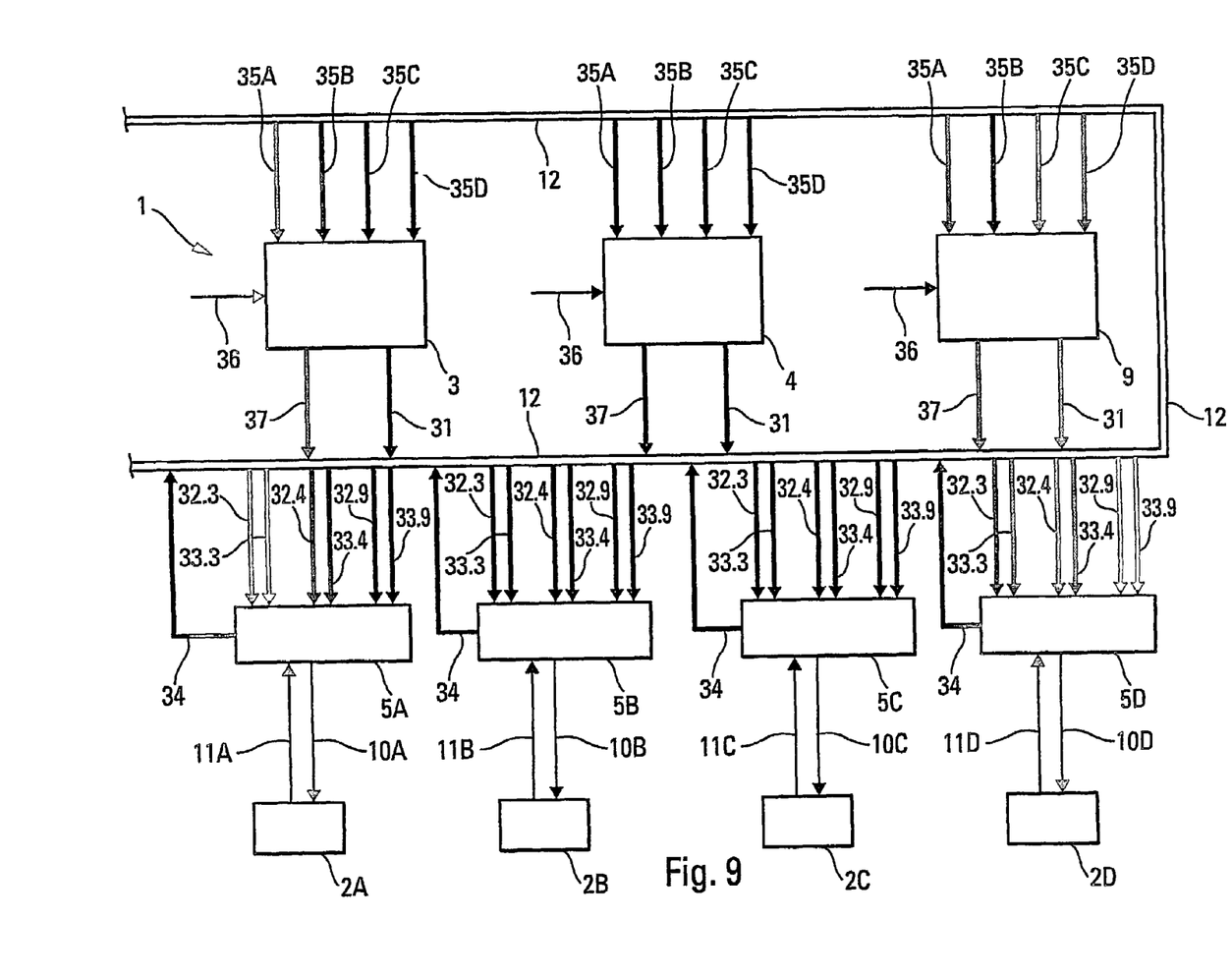
FIG. 9 diagrammatically shows a system in accordance with the invention, applied to an aircraft fitted with a plurality of engines.

The supervising system 1 in accordance with the invention is most particularly appropriate for simultaneously supervising the speeds of all the engines 2A, 2B, 2C, 2D of a multi-engine aircraft, as represented in FIG. 9. To do this, the supervising system 1 comprises, in addition to the three information sources 3, 4 and 9 and the information transmission network 12, a supervising unit 5A, 5B, 5C, 5D for each of said engines 2A, 2B, 2C, 2D, said supervising units 5A, 5B, 5C, 5D being similar to the supervising unit 5 of FIG. 1 (the same elements having the same references, accompanied in FIG. 9 by one of the letters A, B, C or D to differentiate between them, as a function of the engine 2A, 2B, 2C or 2D with which they are associated).

Each of said information sources 3, 4, 9 transmits to said network 12, its (first, second or third) predetermined value of the aerodynamic parameter via a link 37, and its correctness item via a link 31.

Moreover, each supervising unit 5A, 5B, 5C and 5D receives:

via a link 32.3, the first value of the source 3;

via a link 32.4, the second value of the source 4;

via a link 32.9, the third value of the source 9;

via a link 33.3, the first correctness item of the source 3;

via a link 33.4, the second correctness item of the source 4; and via a link 33.9, the third correctness item of the source 9.

Additionally, each of said supervising units 5A, 5B, 5C and 5D transmits the corresponding fourth value, by way of a link 34, to the network 12. These fourth values are then transmitted to the various sources 3, 4, 9 by way of links 35A, 35B, 35C and 35D.

Figure 10:
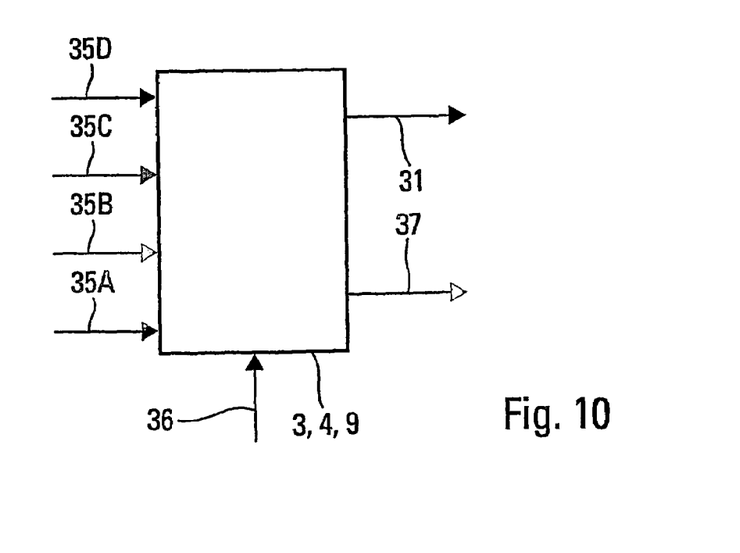
FIG. 10 diagrammatically shows a source of information of a system in accordance with the invention.

By virtue of this information, each of said sources 3, 4, 9, one of which is represented in FIG. 10, can determine its correctness item on the basis of the four values measured on the various engines 2A, 2B, 2C and 2D and from its own value received via a link 36. According to the invention, to determine its correctness item, each information source 3, 4, 9:

computes all the differences between, on the one hand, said fourth values and, on the other hand, its own value of said aerodynamic parameter;

compares these differences with a predetermined threshold value; and deduces therefrom:

if at least half of said differences are below said threshold value, that said correctness item equals 1;

otherwise, that it equals 0.

The invention claimed is:

1. A system for supervising the speed of at least one engine of an aircraft, said system comprising, a first and a second information source determining first and second values of at least one predetermined aerodynamic parameter of the aircraft; and at least one unit for supervising said engine, comprising:

at least one regulation means for acting on the speed of the engine as a function of control orders received;

at least one sensor which is able to measure a fourth value of said aerodynamic parameter, on said engine; and a computation unit which is connected to said first and second information sources, to said regulation means and to said sensor, which receives said first, second and fourth values of said aerodynamic parameter, which takes them into account so as to select a value of said aerodynamic parameter as control value, and which uses the control value thus selected at least to determine a control order which is transmitted to said regulation means, wherein said system furthermore comprises:

a third information source determining a third value of said predetermined parameter; and an information transmission network, to which are linked said first, second and third information sources and said computation unit allowing transmission of information between said first, second and third information sources and said computation unit;

said first, second and third information sources are independent of one another;

said first, second and third information sources respectively determine first, second and third correctness information indicating the correctness respectively of said first, second and third values of said aerodynamic parameter; and said computation unit selects said control value by using said first, second, third and fourth values of the aerodynamic parameter, as well as said first, second and third correctness information.

2. The system as claimed in claim 1, wherein, to select the control value, the computation unit gives priority to the values of said first, second and third information sources with respect to said fourth value of the sensor, it chooses said fourth value only in case of lack of agreement between all the values, and it uses said correctness information at least to resolve any ambiguities.

3. The system as claimed in claim 1, wherein said computation unit uses as control value:

1/ if said fourth value of the sensor is not valid:

A/ if said first, second and third values of said first, second and third information sources are valid and are in agreement, said first value of said first information source;

B/ otherwise:

α) if two of said first, second and third values are valid and are in agreement and if the product of the two corresponding items of correctness information is equal to 1, a correctness item equaling 1 if the corresponding value is apparently correct and 0 otherwise, the lower value of said two values in agreement;

(β) otherwise:

a) if one of said first, second and third values is valid and if the corresponding correctness item equals 1, this value which is valid;

b) otherwise, a predetermined value; and

2/ if said fourth value is valid:

A/ if one of said first, second and third values is valid and is in agreement with one other of them, as well as with said fourth value, this value in agreement;

B/ otherwise:

α) if two of said first, second and third values are valid and are in agreement and if the product of the two corresponding items of correctness information is equal to 1, the lower value of said two values in agreement;

β) otherwise:

a) if one of said first, second and third values is valid, if it is in agreement with said fourth value and if its correctness item equals 1, this value which is valid;

b) otherwise, said fourth value of the sensor.

4. The system as claimed in claim 3, wherein two values are in agreement when their difference is less than a predetermined threshold value.

5. The system as claimed in claim 3, wherein a value is valid when it lies between two predetermined limit values.

6. The system as claimed in claim 1, wherein said computation unit carries out a weighting upon a change of selection of value for the control value.

7. The system as claimed in claim 1, wherein said computation unit is disconnectable as regards the selection of the control value.

8. The system as claimed in claim 1, wherein said computation unit receives said fourth value on two different channels, and uses the two values thus received.

9. The system as claimed in claim 1, for supervising the speeds of a plurality of engines of an aircraft fitted with said plurality of engines, which comprises, for each engine of said plurality of engines whose speed it supervises, a specific supervising unit, of a plurality of supervising units, each said specific supervising unit comprising a regulation means, a sensor and a computation unit.

10. The system as claimed in claim 9, wherein each of said first, second and third information sources receives from all the plurality of supervising units the fourth values measured by the sensor of each of said plurality of supervising units and determines its correctness item from these fourth values.

11. The system as claimed in claim 10, wherein, to determine its correctness item, each of said first, second and third information sources:

computes all the differences between said fourth values and its value of said aerodynamic parameter;

compares the differences with a predetermined threshold value; and deduces therefrom:

if at least half of said differences are below said threshold value, that said correctness item equals 1; otherwise, that it equals 0.

* * * * *